Jan. 26, 1937.  A. W. COFFMAN  2,068,975
COMPOSITE ARTICLE OF MANUFACTURE

Filed March 31, 1936

Inventor.
Alden W. Coffman
by Jas. F. Churchill Atty.

Patented Jan. 26, 1937

2,068,975

UNITED STATES PATENT OFFICE 2,068,975

COMPOSITE ARTICLE OF MANUFACTURE

Alden W. Coffman, Pittsburgh, Pa., assignor to H. H. Robertson Company, Pittsburgh, Pa., a corporation of Pennsylvania Application March 31, 1936, Serial No. 71,971

4 Claims. (Cl. 154—2)

This application is a continuation-in-part of my copending application Serial No. 14,675, filed April 4, 1935, entitled "Composite article of manufacture."

This invention relates to a new article of manufacture and to a novel method for making the same.

The new article comprises a base member, which may be metallic or non-metallic, such as black iron or steel, aluminum, brass, stainless steel, galvanized iron, glass, or the like, and a fibrous layer composed in whole or in part of animal fiber, which is adhesively affixed to the base member by a material which is present in the fibrous layer in a non-adhesive condition but which is rendered adhesive by heat.

The new article of manufacture is capable of a wide range of uses in the industrial arts and can be produced at a minimum cost and under the most favorable conditions, in that the adhesion may be effected with the base member and the fibrous layer in a dry condition as will be described.

The material present in the animal fiber of the fibrous layer in a normally non-adhesive condition or state may be converted into an adhesive condition by heat derived from the base member, which method of heating the fibrous layer is not only economical but has other advantages as will be described.

Figure 1:
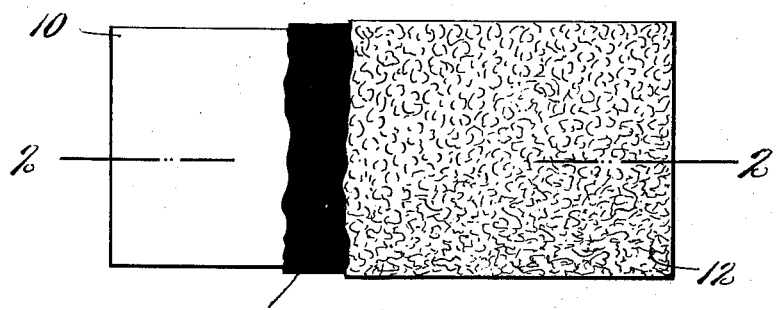
Figure 1 is a plan view, with parts broken away, of one form of the improved article.

Referring to the drawing, 10 represents the base member and 12 the fibrous layer which is affixed thereto by an adhesive 13, which is present in the animal portion of the fibrous layer in a normally non-adhesive condition.

The base member 10 may be of metal, such as black iron or steel, aluminum, brass, stainless steel, or the like, or may be of non-metallic material such as glass or the like.

In a preferred embodiment of the invention, the fibrous layer 12 is provided with animal fibers, which are normally non-adhesive but are rendered adhesive by heat. The fibrous layer 12 may be composed of 100% wool or other animal fiber, or it may be composed of animal and vegetable fibers, such as wool and cotton, as in commercial cotton felts, and when so composed, the animal fiber is present in sufficient quantity to ensure proper adhesion of the fibrous layer to the base member.

Any animal fibers may be used in my process. Thus I have experienced very good results with camel, cattle, wool, etc. Of course, it will be understood by those skilled in the art that the animal fibers herein referred to are first cleaned in the customary commercial manner to remove the extraneous greasy and deleterious constituents which normally make these fibers unusable for the manufacture of fibrous felts, etc.

While it is difficult to determined the exact nature of the reaction taking place upon the application of heat to these fibers it seems likely that the breakdown of the fiber by heat is due to the decomposition or hydrolysis of the keratin contained in the various fibers to a sticky or glue-like constituent. This change, however, takes place in such a thin layer adjacent to the heated body that it would be exceedingly difficult to determine exactly what the change is. It is to be emphasized, however, that such a change takes place in the fiber and is not due to the presence of any extraneous material originally present in the unclean fibers.

While the temperatures of operation vary quite widely, depending upon the nature and thickness of the base material as well as the thickness of the fiber layer, it has been found that on light gauges of steel an operating temperature of between 425° and 475° C. is satisfactory. However, as herein stated, the heat thus applied should be carefully regulated to the end that charring of the main body of the fibrous layer will be avoided and so that the main portion of the fibrous layer maintains the properties of the original fibrous material.

It has been ascertained that the percentage of the animal fiber should not be less than five per cent.

The heat necessary to convert the normally non-adhesive material into an adhesive material should be such as to avoid charring the main portion of the fibrous layer and thereby avoid weakening of the fibrous layer, the main portion of which remains in its normal condition.

To this end, the heat required to convert the material in the fiber in a non-adhesive condition into an adhesive condition may and preferably will be obtained from the base member itself, which latter is heated to the proper or desired temperature before the fibrous layer is brought into contact therewith, and when the fibrous layer is brought into contact with the heated metal or other base member, the fibrous layer and the base member are subjected to pressure.

This may be effected commercially at low cost by passing the heated base member and the fibrous layer on one or both sides of the heated base member, between suitable rolls by which the pressure is applied substantially at the point of contact of the fibrous layer or layers with the heated base member, and after passing through such rolls, the article thus made is allowed to cool and will have the inner or back surface of the fibrous layer firmly affixed to the base member and capable of being used as such or fabricated into other forms or shapes.

This is especially true when the base member is in the form of a sheet, bar, or plate.

Figure 2:
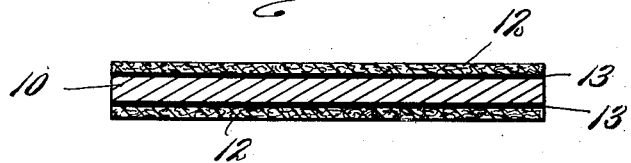
Figure 2 is a section on an enlarged scale of the article shown in Figure 1, the section being taken on the line 2—2.
Figure 3:
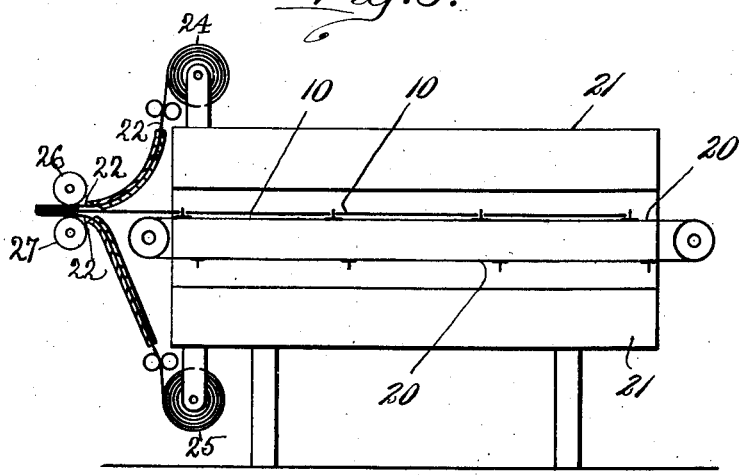
Figure 3 is a diagrammatic view of an apparatus with which the improved article may be produced.

In Figure 3 is represented diagrammatically an apparatus with which the new article shown in Figures 1 and 2 may be produced. In Figure 3, the base members 10 are carried by an endless carrier 20 through a heating furnace 21, such as an electrically heated furnace, the temperature of which can be accurately controlled in a manner well understood.

On its passage through the furnace 21, the base member is heated to the desired temperature, and as it issues from the furnace, the heated base member 10 has applied to one or both of its surfaces the fibrous layer or layers 22, which are taken from rolls 24, 25 and are passed with the heated base member between pressure rolls 26, 27.

The material present in the fibrous layers in a normally non-adhesive condition, which in the case of commercial cotton felt is the wool fiber therein, is converted by heat from the base member into an adhesive condition, with the result that the fibrous layers are firmly affixed to the base member.

It will be observed that the conversion of the wool fibers from a non-adhesive condition into an adhesive condition takes place on the surface of the felt which contacts with the base member, which surface may be designated the inner or back surface, and that this conversion can be controlled by regulating the heat of the base metal, so that the main portion of the felt layer may remain in its normal condition and of its normal strength.

This is particularly advantageous when the fibrous layer is a felt having its inner surface composed of wool and cotton fibers and the outer surface composed of wool fibers alone, in that the article produced will have the felt layers firmly adhering to the base member while the outer surface will retain the normal wool characteristics.

It will also be observed that, by controlling the heat of the base member, the extent to which the conversion penetrates into the fibrous layer from the inner side thereof may be controlled, with the result that the fibrous layer is not materially weakened and its outer surface retains its normal condition.

In the case of fibrous layers containing sufficient wool or other animal fiber to obtain the adhesion, it will be observed that the normally non-adhesive material or substance is inherent in the structure of the fibrous layer.

It will be observed that in the making of the new article as above described, the component members of the article are in a dry condition and the use of liquids is avoided, and, therefore, the new article is made under hygienic conditions and can be produced in an economical manner.

By the use of the term "break-down" as employed in my claims, I intend to define and embrace an article and process of making the same wherein the fibrous layer is adhesively affixed to the base by an adhesive resulting from the decomposition by the heat of constituents of the animal fibers in the portion of the fibrous layer adjacent the base, which constituents are inherent in the commercial forms of felts, fabrics, and the like embodying animal fiber.

Having thus described my invention, what I claim is:

1. An improved article of manufacture comprising a base member and a layer of fibrous material affixed thereto, said layer of fibrous material being composed at least in part of animal fiber and being affixed to the base member by a break-down adhesive resulting from the decomposition under heat of inherent constituents of the animal fibers in the fibrous layer.

2. The process of uniting a fibrous layer containing animal fiber to a base comprising heating the base to store heat therein, and then applying the fibrous layer containing animal fiber to the heated base under pressure, said base being heated to a temperature sufficient to effect the production of a break-down adhesive, in the portions of the fibrous layer adjacent the base, from the normally contained constituents of the animal fiber.

3. As an improved article of manufacture comprising a base member and a layer of fibrous material affixed thereto, said layer of fibrous material being composed at least in part of wool fiber and being affixed to the base member by a break-down adhesive resulting from the decomposition under heat of inherent constituents of the wool.

4. The process of uniting a fibrous layer containing animal fibers to a base by an adhesive inherently contained in said animal fibers, which comprises the steps of applying the fibrous layer containing the animal fibers to the base, and heating the portion of the fibrous layer adjacent the base to a sufficient extent to render the normally non-adhesive constituents of the animal fibers sufficiently adhesive whereby to bond the same securely to said base.

ALDEN W. COFFMAN.